United States Patent [19]

Schayes et al.

[11] 4,447,829
[45] May 8, 1984

[54] FACSIMILE TRANSMISSION ARRANGEMENT

[75] Inventors: Raymond G. G. Schayes; Pol A. G. J. Gustin; Robert Bodart; Michel F. D. J. Berck, all of Brussels, Belgium

[73] Assignee: U.S. Philips Corp., New York, N.Y.

[21] Appl. No.: 387,917

[22] Filed: Jun. 14, 1982

[30] Foreign Application Priority Data

Aug. 18, 1981 [BE] Belgium .................................. 205695

[51] Int. Cl.³ .............................................. H04N 1/00
[52] U.S. Cl. ..................................... 358/260; 358/280
[58] Field of Search ............... 358/260, 261, 280, 282, 358/283, 903

[56] References Cited

U.S. PATENT DOCUMENTS

| | | | |
|---|---|---|---|
| 4,231,069 | 10/1980 | Wellendorf et al. ................. | 358/283 |
| 4,251,837 | 2/1981 | Janeway .............................. | 358/283 |
| 4,259,694 | 3/1981 | Liao .................................... | 358/283 |
| 4,303,948 | 12/1981 | Arai et al. ........................... | 358/903 |
| 4,345,276 | 8/1982 | Colomb ............................... | 358/903 |
| 4,384,307 | 5/1983 | Kuzmik et al. ...................... | 358/903 |

*Primary Examiner*—Howard W. Britton
*Assistant Examiner*—Edward L. Coles
*Attorney, Agent, or Firm*—Thomas A. Briody; William J. Streeter; Charles E. Quarton

[57] ABSTRACT

Facsimile transmission arrangement for documents which are divided into document lines and which contain photographs in addition to text. The text zones of a document line are subjected to a normal run-length coding. The photo zones are subjected to a photo coding. Therein, areas which have a uniform grey tone are first converted into a sequence of binary "0" and "1" elements which succeed each other in a regular alternation. Thereafter a first and a second code word are generated which indicate the number of binary "0" elements and the number of binary "1" elements, respectively of the sequence. These code words are transmitted to the receiver either directly or after having been converted into a Huffman code.

1 Claim, 7 Drawing Figures

FACSIMILE TRANSMISSION ARRANGEMENT

A. BACKGROUND OF THE INVENTION

A.(1) Field of the Invention

The invention relates to a digital facsimile transmission arrangement comprising a transmitter and a receiver for the transmission of document information, which, in addition to text information also contains photographic information, in the form of a digital signal.

A(2). Description of the Prior Art

Facsimile transmission arrangements have been known for a very long period of time already (approximately 130 years). They have for their object to transmit document information from a transmitter to a receiver. For that purpose the document is divided into document lines having a predetermined line width. Internationally, it has been proposed to opt for such a line width that each millimeter of the document contains 3.85 document lines.

As is known, the transmitter of a facsimile transmission arrangement comprises in its most general form the following components:
- a reading arrangement for converting a document line into an analog line signal;
- a first coding arrangement for converting an analog line signal into a binary line signal consisting of a sequence of binary elements which have a first or a second value;
- a second coding arrangement for coding the binary line signal;
- a transmitter output coupled to the output of the second coding arrangement for producing a transmitter output line signal which characterizes the document line.

In its most general form the receiver co-operating with said transmitter comprises the following components;
- a receiver input for receiving the transmitter output line signal;
- a decoding arrangement coupled to the receiver input and arranged for decoding the received transmitter output line signal;
- a reproduction arrangement coupled to the output of the decoder arrangement.

In contemporary embodiments of facsimile transmission arrangements, each document line is divided into a plurality of picture elements. Internationally it has been proposed to divide each document line in, for example, 1728 picture elements. The read arrangement converts each picture element into a signal element which is in the form of a constant signal value which is present during a predetermined period of time $\tau$ and whose magnitude is proportional to the average luminance of said picture element.

In its most simple form, the first coding arrangement is a threshold circuit which converts every signal element whose signal value is lower than a threshold value into, for example, a binary 1-element and which converts every signal element whose signal value is higher than or equal to said threshold value into a binary 0-element.

It is customary to implement the second coding arrangement as a run-length coding arrangement.

It partitions the binary line signal applied thereto into sub-sequences, in such a manner that each sub-sequence contains only binary elements of the same type and that two consecutive sub-sequences contain elements of different types. Such a sub-sequence is sometimes denoted "run" and the number of binary elements it contains is denoted "run-length". Each run-length is now indicated by a code word. Each codeword is formed from a number of binary elements which in this connection are sometimes called "bits". The number of bits of a codeword is denoted wordlength. This wordlength may be the same for all run-lengths but it is alternatively possible to have the word-length depend on the chance of occurrence of a certain run-length (see reference 1). Said run-length coding arrangement has for its object to convert the binary line signal, which usually consists of 1728 binary elements into a sequence of codewords in such a manner that said codewords together contain a considerably lower number of bits.

In known embodiments of facsimile transmission arrangements this sequence of codewords is at the same time the transmitter output line signal which is transmitted to the receiver. For the transmission said sequence is terminated by an auxiliary codeword which indicates the end of said sequence and at the same time the beginning of the following sequence.

In the receiver which cooperates with this transmitter the received sequence of codewords is applied to the decoding arrangement, which is now in the form of a run-length decoding arrangement. It converts each codeword into a run of binary elements of the same type and thus produces an accurate copy of the binary line signal. This copy is applied to the reproducing arrangement which prints a black picture element at the occurrence of each binary 1-element and a white picture element at the occurrence of each binary 0-element. Reference 2 describes in great detail a reproducing device which has appeared to be very suitable for practical usage.

The facsimile transmission arrangements of the above-described construction appear to be particularly suitable for the transmission of documents which contain only text and/or possibly figures comparable therewith, such as diagrams of electric circuits, or drawings of mechanical constructions. Photographs can only be reproduced with this arrangement with very little detail, the reason being that photographs contain half-tones, while the reproducing arrangement can only produce white and black picture elements.

To render it nevertheless possible to realise with such a reproducing arrangement the picture half-tones necessary for photographs, reference 3 proposes to divide the document into text zones and in photo zones and to apply every portion of the analog line signal relating to a text zone to a text coding arrangement which may be in the form of a threshold circuit, and to apply every portion of the analog line signal relating to a photo zone to a photo coding arrangement. Last-mentioned coding arrangement then incorporates an integrator which is charged by a current whose value is proportional to the instantaneous value of the analog line signal. Each time the voltage across the integrator reaches a predetermined value, said integrator is discharged and a binary 1-element is supplied. The text-coding arrangement produces a binary line signal which will be designated text-line signal and the photo-coding arrangement produces a binary line signal which will be designated photo-line signal.

Thus, in this prior art transmission arrangement, the first coding arrangement is arranged for converting the analog line signal into a first binary line signal, i.e. the text-line signal and into a second binary line signal, i.e. the photo-line signal. As only one of these two line signals, or a combination of both line signals, constitutes an accurate representation of the document line to be transmitted, a selection circuit is also provided for generating a binary document line signal consisting of either the text-line signal or the photo-line signal or of a combination of portions of these line signals. The run-length coded version of this binary document line signal is now applied to the transmitter output as the transmitter output line signal.

B. SUMMARY OF THE INVENTION

As has already been described in the foregoing, the photo-coding arrangement only incidentally produces a binary 1-element if the luminance level of the photograph is very high. If in contrast therewith said luminance level is very low (so almost black) then a binary 0-element is produced only incidentally. With run-length coding having a variable word length, the word length depends on the chance that a run occurs with a certain length; the greater the chance, the shorter the word-length. Since the recommended coding (Modified Huffman code, see reference 1) is based on statictics of documents which contain text only, it is not optimally adapted to documents containing photographs. In practice it therefore appears that when a document line contains one or more photo zones, that then the binary document line signal usually comprises a considerably lower number of binary elements than the run-length coded version thereof. It has already been proposed to transmit in such a case the binary document line signal instead of its coded version. Although the time required to transmit a document with photo zones is considerably reduced, this time is still relatively very long, compared to a document which contains only text.

The invention has for its object to reduce in a facsimile transmission arrangement suitable for the transmission of documents which contain photo zones in addition to text zones, the time necessary for the transmission of such a document to a considerable extent.

According to the invention, the second coding arrangement therefore comprises:
- a luminance change detector coupled to the first coding arrangement and arranged for supplying a detection signal when the luminance of the document line has changed by at least a predetermined value;
- a first and a second auxiliary coding arrangement to which the first binary (or text) line signal and the second binary (or photo) line signal, respectively is applied, the second auxiliary coding arrangement being controlled by the detection signal and being arranged to convert the sequence of binary elements occurring in said photo-line signal between two consecutive detection signals into a code-word group which characterizes on the one hand the number of binary elements of the first value occurring in said sequence and on the other hand the number of binary elements of the second value occurring in said sequence.

According to the invention, the coding arrangement in the receiver comprises:
- a first and a second auxiliary coding arrangement which each have an input coupled to the receiving arrangement and produce a first and a second binary auxiliary line signal, respectively, the second auxiliary decoding arrangement being arranged to convert each received codeword group into a sequence of binary elements comprising a number of elements of the first value, characterized by this group and a number of elements of the second value, characterized by said group, the elements having the first and the elements having the second value regularly alternating in said sequence;
- a reproduction selection circuit for applying selected portions of the first and selected portions of the second binary auxiliary line signal to the reproduction device.

In practice the first auxiliary coding arrangement and the first auxiliary decoding arrangement will be formed by a well known run-length coding arrangement and a run-length decoding arrangement, respectively.

The code word group will consist of two code words, one code word of which may indicate how many binary 0-elements the sequence contains and the other code word may indicate how many binary 1-elements said sequence contains. It is alternatively possible that one of the two code words indicates the total number of binary elements of the sequence.

The invention is based on the idea that each photograph has areas with a half-tone which is uniform over the entire area. As is known, a certain half-tone is given to an area by distributing a plurality of black picture elements uniformly over said area (the background of which is white). Of the code words in the code word group, one of these two code words or the sum of them represents the size of the said area (so the total number of picture elements in that area) and one of the two code words represents the number of black picture elements. These last-mentioned elements are uniformly distributed over this area by the reproduction arrangement.

C. References

1. International Digital Facsimile Coding Standards; R. Hunter, A. H. Robinson; Proceedings of the IEEE, Vol. 68, No. 7, July 1980, pages 854–867.
2. Electrostatic Printing; U. Rothgordt; Philips' Technical Review, Vol. 36, No. 3, 1976, pages 57–70.
3. Facsimile circuit; R. G. G. Schayes, P. A. G. J. Gustin; U.S. Pat. No. 4,208,677 (PHN 8855).
4. Facsimile System; R. W. Carlisle; U.S. Pat. No. 2,255,408.

D. SHORT DESCRIPTION OF THE FIGURES

E. DESCRIPTION OF THE EMBODIMENTS

E. (1) The general structure

Figure 1:
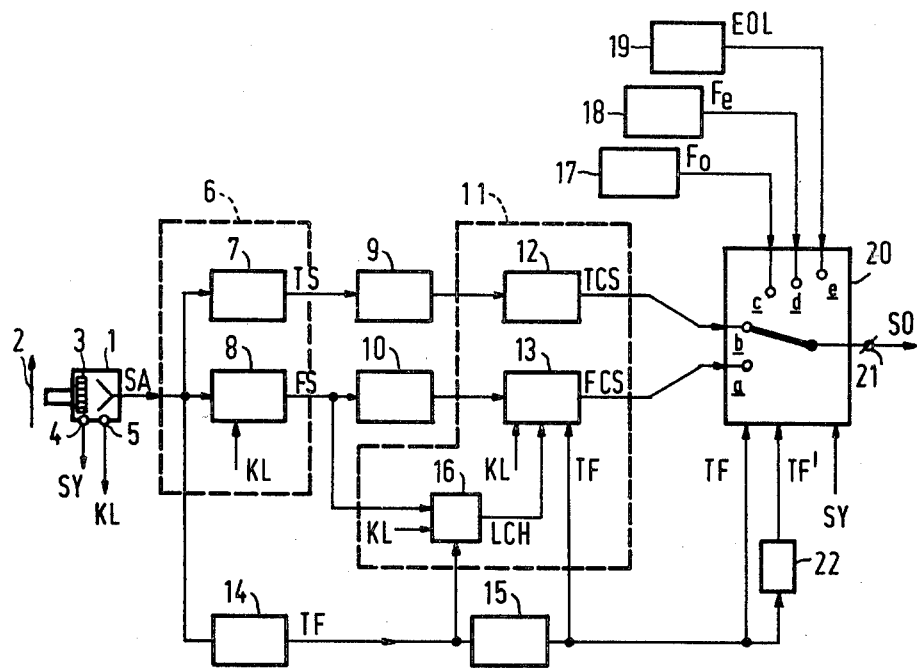
FIG. 1 shows a transmitter in accordance with the invention.

FIG. 1 shows an embodiment of a transmitter for use in a facsimile transmission arrangement. This transmitter comprises a modern read-arrangement 1 which depicts each line of a document 2 on a line array 3. In practice, this line array is formed by, for example, 1728 adjacent photo-sensitive semiconductor elements. That document line portion depicted on one semiconductor element is denoted picture element. Each semiconductor element produces a current or a voltage the value of which is proportional to the average luminance of the picture element depicted thereon. At the rate of clock pulses KL these semiconductor elements are connected sequentially and each for a predetermined period of time $\tau$ to the output of said reading arrangement via an amplifier. In this way each document line is converted into an analog line signal which is indicated by SA in the figure.

Each time the last semiconductor element of the line array has been connected to the output of the reading arrangement during the time $\tau$ a synchronizing pulse is produced which has, for example, the logic value "0", whereafter said output is again connected to the first semiconductor element of the line array.

The synchronizing pulses form together a synchronizing signal which is designated SY in the Figure. This synchronizing signal appears at an output 4 of the reading arrangement, while the clock pulses KL appear at an output 5 thereof.

The analog line signal SA is applied to a first coding arrangement 6 which comprises a text-coder 7 and a photo-coder 8. The text coder 7 is in the form of a limiter circuit. It converts an analog signal element into a binary 0-element which is also present during a time $\tau$ when this analog signal element is larger than or equal to a threshold value. If in contrast therewith this analog signal element is smaller than said threshold value a binary 1-element is then generated. Thus, said text decoder converts the analog line signal SA into a first binary line signal which is denoted TS in the figure and is called text-line signal.

The photo-coder 8 is of the construction which is described in great detail in reference 3. For the sake of brevity it should here be noted that it comprises an integrating network to which a current is applied the magnitude of which is proportional to the instantaneous value of the analog line signal SA. Each time the voltage across said integrating netword has exceeded a predetermined threshold value this voltage is reduced by this threshold value at the moment a clock pulse KL occurs and a binary 1-element is simultaneously produced. Thus, this photo-coder converts the analog line signal SA into a second binary line signal which is denoted in the Figure by FS and is designated photo-line signal.

The text-line signal and the photo-line signal are both applied via a delay device 9 and 10, respectively to a second coding arrangement 11, which comprises a first and a second auxiliary coding arrangement 12 and 13, respectively. The first auxiliary coding arrangement 12 is in the form of a run-length coder with variable word length and is supplied with the text-line signal TS. Internationally, it has been proposed (see reference 1) to assign a codeword to the different run-lengths in conformity with the modified Huffman code. Each text-line signal is converted in this manner into a sequence of sequentially occurring code words of varying lengths, the bits of which occur in series. Thus, said run-length coder 12 produces a coded version of the text-line signal TS. Said coded version is indicated by TCS in the Figure.

The second auxiliary coding arrangement 13 is in the form of a block-coder. The construction thereof will be further described hereinafter, with reference to FIG. 3. It should here be noted that it receives the photo-line signal FS and is controlled by the clock pulses KL, by detection pulses LCH and by a binary text-photo indication signal TF. The last-mentioned signal TF indicates whether the analog line signal SA relates to a photo zone or to a text zone. If SA relates to a photo zone and a LCH-pulse is produced, this means that a change in luminance has occurred. Now the block-coder 13 converts the sequence of binary elements in the photo-line signal FS occurring between two consecutive detection pulses LCH into a codeword group which preferably consists of two code words. The first code word $N_W$ then indicates how many binary 0-elements the sequence contains and the second code word $N_B$ preferably indicates how many binary 1-elements the sequence contains. For the purpose of adapting them to prior art facsimile equipment which is not suitable for the transmission of photographs, these code words are additionally subjected to a variable word-length coding in which, as also in the run-length coder, use is made of the modified Huffman-code. Thus, the block-coder produces a coded version of the photo-line signal FS. This coded version is denoted in the Figure by FCS, it being assumed that the bits of the code words in FCS occur serially.

The binary text-photo indication signal TF is generated by a text photo-indication circuit 14, which receives the analog line signal SA and may be implemented in the manner as described in great detail in reference 4, but preferably in the manner described in great detail in reference 3. When SA relates to a text zone, then it will hold that TF=0. If, in contrast therewith, SA relates to a photozone then it will hold that TF=1. This signal TF is applied to the block-coder 13 via a delay circuit 15.

The detection pulses LCH are generated by a luminance change detector (abbreviated to LCH-detector) 16 which receives the photo-line signal FS, the binary signal TF and the clock pulses KL. The construction of this LCH detector will be further described hereinafter with reference to the FIGS. 4 and 5. Here it should only be noted that each time there is a change in luminance in the document line and this change exceeds a predetermined value this detector 16 then produces a LCH-pulse (LCH=luminance change).

In addition, the transmitter shown in FIG. 1 comprises three word generators. The first word generator 17 produces a begin-of-photo codeword $F_o$, the second word generator 18 produces an end-of-photo code word $F_e$ and the third word generator 19 produces an end-of-line code word EOL.

The signals FCS, TCS and the three code words $F_o$, $F_e$ and EOL, are each applied to an input (a, b, c, d, e) of a switching arrangement 20. This switching arrangement is only shown symbolically in the Figures. In practice it will usually be of an electronic implementation. In addition to the required inputs it has an output 21 which also constitutes the output of the transmitter and at which a binary transmitter output line signal SO appears which characterizes the original document line.

This switching arrangement is controlled by three signals, namely the synchronizing signal SY, the text-photograph indication signal TF and a delayed version TF' of TF, produced by a delay line 22. This control is as follows.

1. If SY=0 then input e is connected to output 21 and the code word EOL is transmitted.
2. If SY=1, then it holds that:
   if TF=1 and TF'=0, then input c is connected to output 21 and the begin-of-photo code word $F_o$ is transmitted;
   If TF=1 and TF'=1, then input a is connected to output 21 and the photo-line signal TCS is transmitted;
   If TF=0 and TF'=1, then input d is connected to output 21 and the end-of-photo code word $F_e$ is transmitted;
   If TF=0 and TF'=0, then input b is connected to output 21 and the text-line signal TCS is transmitted.

Figure 2:
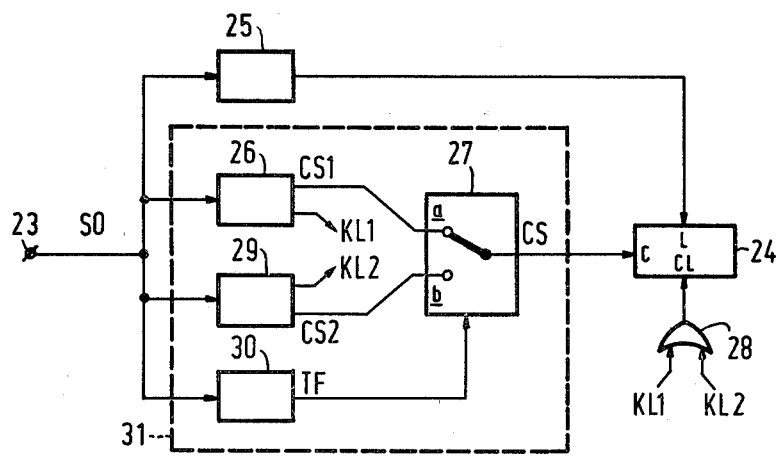
FIG. 2 shows a receiver in accordance with the invention.

FIG. 2 shows an embodiment of a receiver which may cooperate with the transmitter shown in FIG. 1. This receiver has a receiver input 23 for receiving the transmitted binary transmitter output line signal. If for the sake of convenience it is assumed that no transmission errors occur on the transmission path, then the received signal is equal to SO. This signal is used to control a reproducing arrangement 24. This reproducing arrangement has for that purpose three inputs denoted by L, C and CL, respectively. To take a specific example, it will be assumed that said reproducing arrangement is in the form of a line printer which prints a dot each time a clock pulse appears at the clock pulse input CL. The colour (white or black) of this dot is determined by the logic value of the colour signal CS applied to the colour input C. If, for example, CS=0 then a white dot is printed. If in contrast therewith CS=1, then a black dot is printed. When the dots of a new line must be printed, then an EOL pulse is applied to the line input L. This last-mentioned pulse is produced by an EOL-detector 25 of a conventional construction. The received signal SO is applied to this detector, which produces said EOL pulse each time it detects the presence of an EOL code word.

This signal So is not only applied to the EOL detector 25 but also to a coding arrangement 31, which produces the colour signal CS. For that purpose said decoding arrangement 31 comprises a first and a second auxiliary decoding arrangement 26 and 29, respectively which produce a respective first and second auxiliary line signal CS1, SC2. More specifically, the first auxiliary decoding arrangement is in the form of a run-length decoder of a conventional construction and which produces a clock signal KL1 in addition to the auxiliary line signal CS1. The signal SC1 has the logic value 1 and 0, respectively during a number of consecutive clock pulses KL1, this number corresponding to the length of a run of black and white picture elements, respectively in the original document line. This colour signal CS1 is applied to an input a of a switching arrangement 27, which here is also shown only symbolically. The clock pulses KL1 are applied to the clock pulse input CL of the printer 24 via an OR-gate 28.

The second auxiliary decoding arrangement 29 is in the form of a block decoder to which also the received signal SO is applied, but the construction of which will be described in greater detail hereinafter with reference to FIG. 6. It should be noted here that this block decoder produces a second auxiliary line signal CS2, which is applied to the input b of the switching arrangement 27. It also produces clock pulses KL2 which are applied to the clock pulse input CL of printer 24 via the OR-gate 28. The signal CS2 is identical to the photo-line signal FS and is obtained because of the fact that the block detector converts each code word group ($N_W$, $N_B$) produced by the block coder in the transmitter into a sequence of binary elements. The number of binary elements of the sequence is equal to the sum $N_W+N_B$ of these code words and the length of each element is equal to a clock pulse period of KL2. In this sequence, and also in FS, the dissimilar binary elements alternate regularly.

Whether signal CS1, or signal CS2 will be applied to the colour input C of the printer 24 is determined by the text-photo indication circuit 30, the construction of which will be described in greater detail hereinafter with reference to FIG. 7. It should be noted here that this circuit 30 produces a text-photo indication signal TF which has the logic value "1" each time the presence of a begin-of-photo code word $F_o$ is detected in the signal SO. However, this indication signal TF assumes the logic value "0" each time the presence of an end-of-photo code word $F_e$ is detected in the signal SO. If TF=1, then CS2 is applied to the printer and if TF=0, then TS1 is applied to the printer.

E (2). Detailed description of some components

E (2.1.) The block coder

Figure 3:
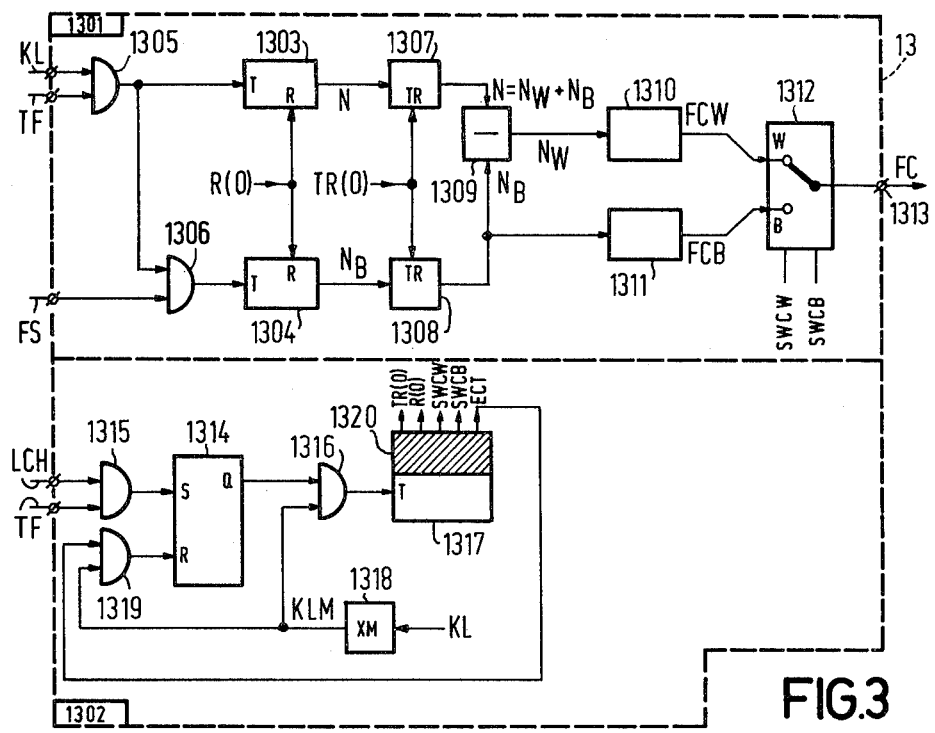
FIG. 3 shows a block-coder for use in the transmitter shown in FIG. 1.

FIG. 3 shows in greater detail the construction of the block coder 13. It comprises a coding circuit 1301 and a control circuit 1302. The coding circuit 1301 incorporates two resettable counters 1303 and 1304, each having a counting pulse input T and a resetting input R. The counter 1303 receives the clock pulses KL which occur as long as TF=1. To that end, KL and TF are applied together to an AND-gate 1306 the output of which is connected to the counting pulse input T of counter 1303. These clock pulses which are applied to counter 1304 are applied together with the photo-line signal FS to an AND-gate 1306 which applies a clock pulse to counter 1304 at each occurrence of a binary 1-element in FS. At the resetting input R the counters 1303 and 1304 simultaneously receive resetting pulses R(0) generated by the control circuit 1302. Counter 1303 now counts the total number of binary elements in FS occurring between two consecutive resetting pulses and counter 1304 counts how many binary 1-elements are contained in this total number of binary elements. Thus, counter 1303 produces a number $N=N_W+N_B$ and counter 1304 produces the number $N_B$.

Memories 1307, 1308 each having a transfer input TR are connected one to each of these counters 1303 and 1304. In response to a transfer pulse TR(0) applied thereto, the content of the associated counter is stored in that memory. This transfer pulse is also generated by the control circuit 1302 and that in such a manner that it occurs shortly before the resetting pulse R(0) is generated.

The memories 1307 and 1308 are connected to inputs of a difference producer 1309 which produces the number $N_W$. This number is applied to a Huffman coder 1301 for white runs, which converts this number into a code word FCW. The number $N_B$ supplied by the memory 1308 is applied to a Huffman coder 1311 for black runs, which converts this number into a code word FCB. In practice the Huffman coders 1310 and 1311 are in the form of a ROM, the numbers $N_W$ and $N_B$, respectively functioning as address codes.

The code word FCW is applied to an input W of a switching arrangement 1312, which is only shown symbolically. Said switching arrangement has, in addition to the input W, also an input B to which the code words FCB are applied. This switching arrangement further has an output 1313 which also constitutes the output of the block coder. It is further controlled by two logic signals SWCW and SWCB which are generated by the control circuit 1302. This control is such that if SWCW=SWCB, none of the inputs is connected to the output 1313. If in contrast therewith SWCW=1 and SWCW=0, then the input W is connected to the output 1313 and if SWCE=0 and SWCB=1, then input B is connected to the output 1313.

In the embodiment shown, the control circuit 1302 comprises a SR-flip-flop 1314. The LCH pulses which are produced, when TF=1 (so when the elements in SA relate to a photo zone in the document line) are applied to the setting input S of this flip-flop. These LCH pulses and this text-photo indication signal TF are jointly applied for that purpose to an AND-gate 1315, the output of which is connected to the setting input S. If a setting pulse is produced at this setting input then the Q-output of said flip-flop assumes the logic value 1, as a result of which clock pulses KLM can be applied to a modulo-M counter 1317 via an AND-gate 1313. These clock pulses KLM are generated by a frequency multiplier 1318 which has a multiplication factor M and to which the clock pulses KL are applied. These clock pulses KLM are not only applied to an AND-gate 1316 but also to the resetting input R of flip-flop 1314 via an AND-gate 1319.

A decoding network 1320 having four outputs the resetting pulses R(0) and the logic signals SWCW and SWCB is connected to counter 1317. This decoding network further has a fifth output which produces the signal ECT which is also applied to AND-gate 1319. If it is assumed that M=6, then this control circuit operates as follows. After the Q-output of flipflop 1314 has assumed the logic value "1", TR(0) becomes equal to 1 in response to the first clock pulse KLM. In response to the second clock pulse KLM, TR(0)=0 and R(0)=1. In response to the third clock pulse, R(0)=0 and SWCW=1. In response to the fourth clock pulse, SWCW=0 and SWCW=1. In response to the fifth clock pulse, SWCS=0 and ECT=1. In response to the sixth clock pulse Q=0 and ECT=1.

E (2.2.) The luminance change detector

Figure 4:
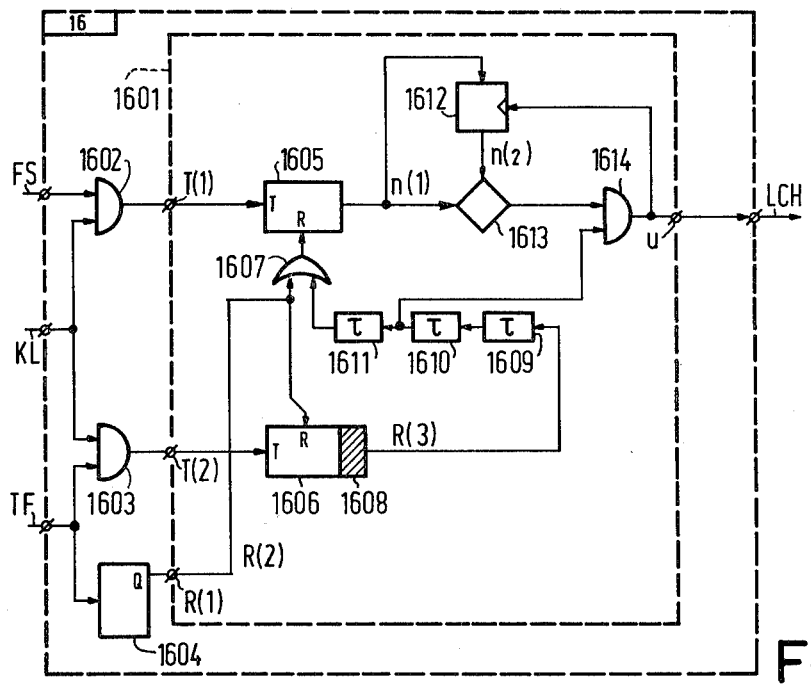
FIG. 4 shows a luminance change detector for use in the transmitter shown in FIG. 1.

FIG. 4 shows schematically a possible construction of the luminance change detector 16. The construction of this circuit is based on the following consideration. In a photo zone the photo-line signal FS has a uniform distribution of "0" and "1" elements. The elements which are in the minority will be designated minority elements and the elements which are in the majority will be designated majority elements. The minority elements are located in isolated positions between the majority elements. The number of majority elements located between two consecutive minority elements will be designated minority interval. For line segments having a uniform luminance the different minority intervals will differ relative to each other for not more than one element. If now such a line segment is divided into a number of consecutive auxiliary segments each having the same number of binary elements, namely P, then it will also hold that the number of minority (or majority) elements of the different auxiliary segments will differ relative to each other for not more than one element. By comparing the number of minority (or majority) elements of two consecutive auxiliary elements to each other it can be ascertained whether the luminance has change or not. If the difference amounts to two or more, then it may be assumed that such a change has occurred.

The luminance change detector shown in FIG. 4 comprises a luminance change detector stage (abbreviated to LCH-stage) 1601 which has a first input T(1), a second input T(2), a third input R(1), and an output U. At every occurrence of a binary 1-element in the photo-line signal FS a clock pulse is applied to the input T(1). For that purpose this input T(1) is connected to the output of an AND-gate 1602 to which this photo-line signal FS and also the clock pulse KL are applied. These clock pulses KL are also applied to the input T(2) each time and for as long as the text-photo indication signal TF has the value "1". For that purpose the clock pulses KL and the signal TF are together applied to an AND-gate 1603 the output of which is connected to the input T(2). For every transition from "0" to "1" in the signal TF a resetting pulse R(2) is applied to the input R(1). For that purpose this input R(1) is connected to the output of a monostable trigger circuit 1604 which is controlled by the text-photo indication signal TF.

The clock pulses occurring at the input T(1) are applied to the output pulse input T of a resettable modulo P counter 1605 and the clock pulses occurring at the input T(2) are applied to the counting pulse input T of a resettable modulo-T counter 1606. The resetting pulse R(2) occurring at the input R(1) is directly applied to the resetting input R of the counter 1606 and to the resetting input R of counter 1605 via an OR-gate 1607. This accomplishes that said counters are reset each time the text-photo indication signal TF changes from "0" to "1", since in the document line a text zone is followed by a photo-zone.

Counter 1605 is not only reset when a resetting pulse R(2) occurs at the input R(1), but also when the counter 1606 has reached a predetermined counting position (for example P−1). Therefore, a decoding network 1608 which produces a pulse R(3) each time the counter 1606 assumes the counting position P−1 is connected to this counter 1606. Now two consecutive pulses R(3) define the length of an auxiliary segment. These pulse R(3) are applied to a cascode circuit of three delay elements 1609, 1610 and 1611, the output of the last element 1611 being connected to an input of the OR-gate 1607. In this way it is achieved that as soon as P-clock pulses KL have occurred (so at the end of an auxiliary segment) counter 1605 is reset.

Before counter 1605 is reset its counting position n(1) is compared with a reference value n(2) which is stored in a memory 1612. This comparison is performed in a comparison circuit 1613 which produces a logic "1" each time and for as long as the difference between n(1) and n(2) is two or more and in all other cases produces a logic "0". The output of this comparison circuit 1613 is connected to an input of an AND-gate 1614. This AND-gate has a further input which is connected to the output of the delay element 1610. Thus it is achieved that shortly before the counter 1605 is reset a LCH-pulse occurs at the output of AND-gate 1614 when the difference between n(1) and n(2) is two or more. This LCH-pulse is applied to the output U and also to a clock pulse input of the memory 1612. This memory 1612 has an input which is connected to the output of the counter 1605, so that at the moment the LCH-pulse occurs the counting position n(1) of this counter is stored as a new reference value in the memory 1612.

In practice it has appeared to be very advantageous to use two or more LCH-stages in the luminous change detector 16, each stage having a different value for P. This is illustrated in greater detail in FIG. 5. The detector shown there comprises three LCH-stages 1601(0), 1601(1), and 1601(2), each having a construction as shown in FIG. 4. More specifically, it holds for the LCH-stage 1601(0) that, for example, P=4, for the LCH-stage 1601(1) that P=8 and for the LCH-stage 1601(2) that P=16. Each output U of said stages are connected to an input of an OR-gate 1615 at the output of which the LCH-pulse occurs. The output U of LCH-stage 1601(0) is further connected to the resetting input R(1) of LCH-stage 1601(1) via an OR-gate 1616. In this turn the output U of LCH-stage 1601(1) is connected to the resetting input R(1) of LCH-stage 1601(2) via an OR-gate 1617.

Figure 5:
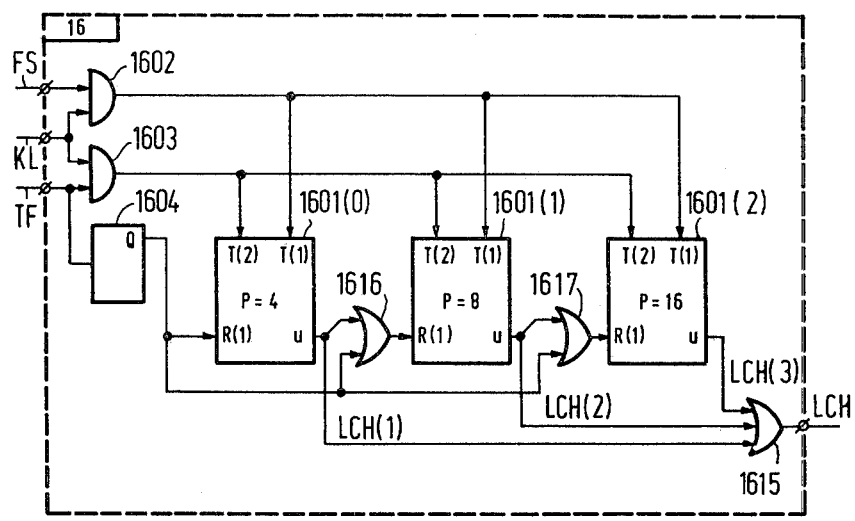
FIG. 5 shows a more extensive version of a luminance change detector.

As in all cases a complete auxiliary segment, consisting of P binary elements must first have been applied to the detector 16 before it can be detected whether a change in luminance has occurred, the delay elements, 9, 10 and 15 which are used in the transmitter shown in FIG. 1 must produce a time delay equal to the length of the shortest auxiliary segment. When the LCH-detector shown in FIG. 5 is used, this time delay must be equal to P=4 clock pulse periods KL.

E (2.3.) The block-decoder

Figure 6:
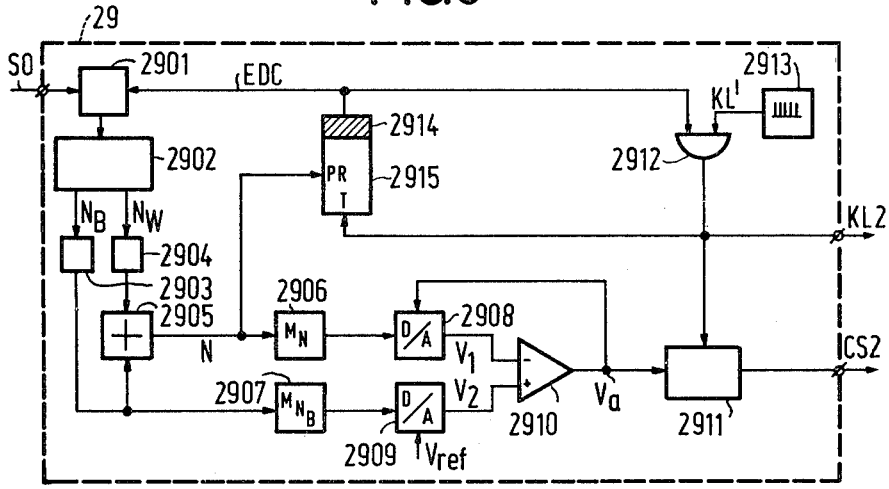
FIG. 6 shows a block decoder for use in the receiver shown in FIG. 2.

FIG. 6 shows an embodiment of the block decoder 29 suitable for use in the receiver shown in FIG. 2. This clock-decoder comprises a buffer 2901 in which the code words present in the received transmitter output line signal SO are temporarily stored. This buffer is controlled by a binary signal EDC in such a manner that each time EDC=0 the code word which is present longest in said buffer is transferred to a Huffman decoder 2902. If the said code word relates to a black run, than the Huffman decoder produces a number $N_B$ at a first output. If, however, said code word relates to a white run, then the Huffman decoder produces a number $N_W$ at a second output. These numbers are stored in a memory 2903 and 2904, respectively. The outputs of these memories are connected to inputs of an adder 2905 which produces the sum $N = N_W + N_B$. The numbers N and $N_B$ are now further stored in a memory 2906 and 2907, respectively. The outputs of these memories 2906 and 2906 are connected to inputs of a digital-to-analog converter 2908 and 2909, which produce the analog output signal $V_1$ and $V_2$, respectively. These signals are applied to the inputs of a differential amplifier 2910 which produces an output signal $V_A$. This output signal $V_A$ is applied as a reference signal to the digital-to-analog converter 2908, while a reference signal $V_{ref}$ is applied to the digital-to-analog converter 2909. The output signal $V_A$ of the differential amplifier 2910 is also applied to a photo-decoder 2911, which is controlled by the above-mentioned clock pulse K12 and which is of a similar construction as the photo-coder 8 used in the transmitter. This photo-coder 2911 produces the second auxiliary line segment CS2 which may be applied to the colour input C of the printer. This signal CS2 consists of a sequence of "1" (black dot) and "0" (white dot) elements. These elements are obtained, as mentioned in the foregoing, by for example, integration of a current the magnitude of which is proportional to the instantaneous value of $V_A$. Each time the voltage across the integrator has exceeded a predetermined threshold value of the magnitude $V_{ref}$ this voltage is reduced by said threshold value at the moment a clock pulse KL2 occurs and a binary 1-element is produced at the same time.

The block-decoder shown in FIG. 6 is based on the following consideration. To have the printer print only black dots, $V_A$ should at least be equal to $V_{ref}$. To have the printer print only white dots, $V_A$ must be equal to 0. Every intermediate grey level must now depend on the ratio of the number of black dots $N_B$ to the total number of picture elements N. This means that it must hold that $V_A = (N_B/N)V_{ref}$ or that $NV_A = N_B V_{ref}$. This can be realized by applying the signal $V_A$ as a reference signal to the digital amalog converter 2908, in conformity with what was described already in the foregoing.

The clock pulses KL2 which are applied to the photo-coder 2911 and also, via OR-gate 28, to the clock pulse input of the printer 24 are taken from the output of an AND-gate 2912 to which the above-mentioned signal EDC and also the clock pulses KL' are applied. These clock pulses KL' are generated by a pulse generator 2913. The signal EDC is generated by a decoding network 2914 which is connected to a presettable down-counter 2915. The clock pulse input T of said counter receives the clock pulses KL2 and its resetting input PR is connected to the output of the adder 2905. The number N supplied by said counter 2905 is then written in the counter 2915, whereafter EDC assumes the logic value "1". This causes the AND-gate 2912 to be realised and the clock pulses to be applied to the counter until this counter assumes the counting position "zero." As a result thereof EDC=0 and two further code words (which together form a code word group) are taken from the buffer 2901 and applied to the Huffman decoder 2902.

E (2.4.) The text-photo indicator

Figure 7:
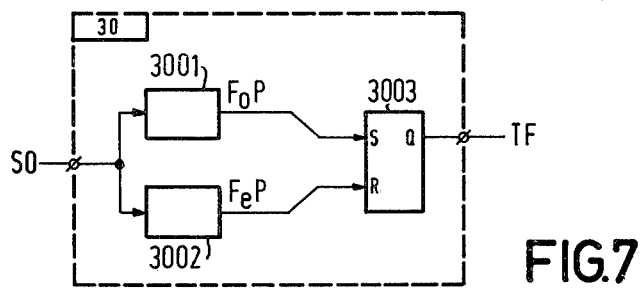
FIG. 7 shows a text-photo indicator for use in the receiver shown in FIG. 2.

FIG. 7 shows an embodiment of a text-photo indicator suitable for use in the receiver shown in FIG. 2. This indicator comprises a begin-of-photo code detector 3001 which produces a begin-of-photo pulse $F_oP$ each time the presence of the begin-of-photo code $F_o$ is detected in the received transmitter output line signal SO. In addition, the detector comprises an end-of-photo code detector 3002 which produces an end-of-photo pulse $F_eP$ each time the presence of the end-to-photo code $F_e$ is detected in the received transmitter output line signal SO. The pulses $F_oP$ are applied to the setting input of SR flip-flop 3003. The pulses $F_eP$ are applied to the resetting input of this flip-flop. The logic signal then occurring at the Q-output of this flip-flop constitutes the text-photo indication signal TF.

E(3). General remarks

1. In the transmitter shown in FIG. 1 the output signal FS of the photo coder is applied to the LCH detector 16. This LCH-detector may, however, alternatively be of such a construction that it is suitable to receive the analog-signal SA produced by the read arrangement 1.

2. Since in practice, both in the run-length coder and in the block-coder, Huffman coding will be used, the Huffman coders 1310 and 1311 shown in FIG. 3 may be used jointly for both coders.

3. For the embodiment of the block-decoder, shown in FIG. 6, it was assumed that the numbers N and $N_B$ may in principle even assume the value 1728. In practice, however, it has appeared to be advantageous to assign a predetermined maximum value to said numbers, for example 255. This can be realized in a simple way by constructing the counter 1303, which is incorporated in the block-coder shown in FIG. 3, as a modulo-255 counter and to have it produce a pulse each time the counting position 255 is reached. This pulse must then be applied to AND-gate 1315, instead of the LCH pulse.

What is claimed is:

1. Facsimile transmission arrangement for transmitting a document which is divided into document lines, comprising:

A. a transmitter which incorporates:
   - (A.a.) a reading arrangement for converting a document line into an analog line signal;
   - (A.b.) a first coding arrangement for converting the analog line signals into a first and a second binary line signal, each consisting of a sequence of binary elements which have a first or a second value;
   - (A.c.) a second coding arrangement for coding the first and the second binary line signal;
   - (A.d.) a transmitter output;
   - (A.e.) a selection circuit for applying selected portions of the first and of the second line signal in coded form to the transmitter output for generating a transmitter output line signal;

B. a receiver incorporating:
   - (B.a.) a receiver input for receiving the transmitter output line signal;
   - (B.b.) a decoding arrangement coupled to the receiver input and arranged for decoding the received transmitter output line signal;
   - (B.c.) a reproducing arrangement coupled to the output of the decoding arrangement characterized in that:
   - (A.f.) the second coding arrangement incorporates:
     - (A.f..a.) a luminance change detector which is coupled to the first coding arrangement and is arranged to produce a detector signal if the luminance of the document line has changed by at least a predetermined value;
     - (A.f.b.) a first and a second auxiliary coding arrangement to which the first and the second binary line signal, respectively is applied, the second auxiliary coding arrangement being controlled by the detector signal and being arranged for converting the sequence of binary elements occurring in said second binary line signal between two consecutive detection signals into a codeword group which on the one hand characterizes the number of binary elements of the first value, occurring in that sequence and on the other hand characterizes the number of binary elements of the second value present in said sequence;
   - (B.d.) the decoding arrangement incorporates:
     - (B.d.a.) a first and a second auxiliary decoding arrangement which are each coupled by means of an input to the receiver input and produce a first and a second binary auxiliary line signal, respectively, the second auxiliary decoding arrangement being arranged for converting each received code word group into a sequence of binary elements which comprise a number of elements which are characterized by the group and have the first value, and a number of elements of the second value which are characterized by said group, in which sequence the elements having the first value and the elements having the second value alternate regularly;
     - (B.d.b.) a reproducing-selection circuit for applying selected portions of the first and selected portions of the second binary auxiliary line signal to the reproducing arrangement.

* * * * *